United States Patent [19]
Burgoyne, Jr. et al.

[11] Patent Number: 5,500,251
[45] Date of Patent: Mar. 19, 1996

[54] PROCESS FOR COATING LOW ENERGY SURFACES

[75] Inventors: William F. Burgoyne, Jr., Allentown; Wiley E. Daniels, Easton; Dennis Sagl, Bethlehem; Heueh-Chi Lee, Allentown; Menas S. Vratsanos, Breinigsville, all of Pa.

[73] Assignee: Air Products and Chemicals, Inc., Allentown, Pa.

[21] Appl. No.: 261,568

[22] Filed: Jun. 17, 1994

Related U.S. Application Data

[60] Continuation of Ser. No. 950,584, Sep. 23, 1992, abandoned, which is a division of Ser. No. 876,940, May 1, 1992, abandoned.

[51] Int. Cl.$^6$ ........................................ B05D 3/00
[52] U.S. Cl. ................ 427/322; 427/412.3; 428/461; 525/282; 525/296
[58] Field of Search ................ 427/207.1, 322, 427/412.3; 525/282, 296

[56] References Cited

U.S. PATENT DOCUMENTS 4,302,484  11/1981  Rosenkranz ........................... 427/44
4,762,882  8/1988  Okano ................................ 525/296
4,997,883  3/1991  Fischer .............................. 525/67

OTHER PUBLICATIONS

S. Wu, "Polymer Interface and Adhesion," Marcel Dehler, New York 1982 Modification of Polymer Surfaces, Mechanisms of Wettability and Bondability . . . p. 279.

J. Schultz, et al, "Surface Properties and Adhesion Mechanisms of Graft Polypropylenes" J. Material Science, 24, 4363–69 (1989).

Walker and Lombardi "Waterborne Urethanes Improve Acrylics Adhesive Performance" Adhesive Age, p. 17 Jul. 1990.

*Primary Examiner*—Christopher Henderson
*Attorney, Agent, or Firm*—Mark L. Rodgers; William F. Marsh

[57] ABSTRACT

N-(4-alkylphenyl)acrylamides, N-(4-alkylphenyl)methacrylamides and N-(4-alkylphenyl)maleimides, when co-polymerized into conventional polymer systems promote adhesion of such systems to low energy polyolefin surfaces. These compounds are effective in increasing the adhesive coating properties of both solution polymer and emulsion polymer systems.

7 Claims, No Drawings

PROCESS FOR COATING LOW ENERGY SURFACES

This is a continuation of application Ser. No. 07/950,584 filed 23 September 1992, now abandoned, which is a Divisional of application Ser. No. 07/876,940, filed 1 May 1992, now abandoned.

TECHNICAL FIELD OF THE INVENTION

The present invention relates to compositions which are useful in coating low energy polymeric surfaces.

BACKGROUND OF THE INVENTION

Many polymeric surfaces, such as polyolefins, exhibit poor adhesion properties due to their low surface energy or polarity. For many applications, however, it is necessary to adhere a polymeric coating to a polyolefin surface in order to obtain desired overall properties.

Most reported methods for improving the adhesive strength of a polymer to a polyolefin surface involve modifying the properties of the polyolefin surface. These methods include chemical oxidation, flaming, plasma treatment, and grafting. Ref. S. Wu, "Polymer Interface and Adhesion", Marcel Dekker, New York, 1982, p.279. These surface treatments are used to change the chemical composition and increase the energy at the surface. Some chemical oxidation methods involve the use of chromic acid, potassium chlorate-sulfuric acid, potassium permanganate-sulfuric acid, nitric acid, sulfuric acid, alkyl peroxides, fluorine, chlorine and ozone.

J. Schultz, et al., J. Material Sci., 24, 4363–69 (1989) discloses modifying polypropylene by adding to the polypropylene a small quantity of polypropylene which has been grafted with a polar species such as maleic anhydride. Since the two polymers are compatible, the resultant polymer blend behaves like a bulk grafted polymer and leads to improved adhesion towards polar substrates.

Additives have also been added to an adhesive in order to promote adhesion to polyolefins such as polypropylene. Walker and Lombardi in Adhesives Age, Vol.33, No.8, 17–19 (1990) report improved adhesion of an acrylic emulsion between aluminum/polypropylene by blending in a polyurethane to the acrylic emulsion.

SUMMARY OF THE INVENTION

We have found that N-(4-alkylphenyl)acrylamides, N-(4-alkylphenyl)methacrylamides, and N-(4-alkylphenyl)maleimides are effective as adhesion promoting monomers. When co-polymerized into conventional polymer systems, these monomers promote adhesion to low energy polyolefin surfaces such as polyethylene and polypropylene. These adhesion promoting monomers are effective in increasing the adhesive coating properties of both solution polymer and emulsion polymer systems. By using these adhesion promoting monomers, prior art pre-treatment methods, such as surface oxidation of the polyolefin surface, can be avoided.

DETAILED DESCRIPTION OF THE INVENTION

N-(4-alkylphenyl)acrylamides, N-(4-alkylphenyl)methacrylamides and N-(4-alkylphenyl)maleimides can be copolymerized with conventional polymeric coating materials to produce a coating composition which exhibits enhanced adhesion performance with respect to low energy polymeric surfaces, such as polyolefins. The subject adhesion promoting compounds are typically in monomeric form, although oligomers can be used, and can be used with any conventional polymeric coating material with which they can be polymerized. For example, one or more of the above compounds can be copolymerized with solution polymers derived from methylacrylate, ethylacrylate, butylacrylate, 2-ethylhexylacrylate and the like, or with emulsion polymer systems derived from acrylates, vinyl acetate/ethylene and the like. The N-(4-alkylphenyl)acrylamides, N-(4-alkylphenyl)methacrylamides and N-(4-alkylphenyl)maleimides which are suitable for this invention can be represented by structural formulas I, II and III respectively.

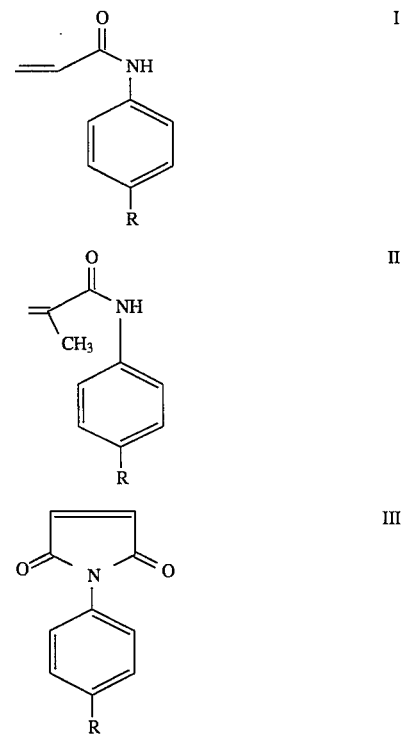

Wherein R is a $C_1$-$C_8$ alkyl group.

The above adhesion promoting compounds are added to the polymer system typically in a concentration of from about 2 to 25 wt % based upon total monomer feed. The resultant polymer solution; i.e., coating composition, can be applied directly to the surface to be coated, and subsequently allowed to dry to form an adherent polymer coating. The coating compositions made in accordance with this invention exhibit enhanced adhesion properties, especially with respect to low energy surfaces such as polyolefins, and in particular polyethylene and polypropylene.

While not being bound by theory, it is believed that the improved adhesion performance of these coating compositions is due to the presence of the 4-alkylphenyl moieties on the polymer backbone and their ability to interact with the low energy polyolefin surface through Van der Waal type interactions and possible entanglement. The present invention is advantageous over prior art methods of improving adhesion to polyolefin surfaces in that surface modification, such as chemical oxidation, is not required to improve adhesion.

The following examples are presented to better illustrate the present invention and are not meant to be limiting.

EXAMPLE 1—(COMPARATIVE)

A polymer coating composition was made by mixing n-butyl acrylate (40.00 g, 0.31 mol) and 2,2'-azobis(isobutyronitrile) (AIBN), available commercially from DuPont under the Trademark Vazo 64, (0.0500 g, 3.04×10$^{-4}$ mol) in toluene (93 mL) and purging with nitrogen for 15 minutes. The stirred solution was heated to 70° C. for 18 h. Removal of the toluene in vacuo gave 39.45 g of polymer product. Properties of this polymer are given in Table 1.

EXAMPLE 2

A mixture of n-butyl acrylate (39.20 g, 0.31 mol), N-(4-tert-butylphenyl)acrylamide (4TBPA) (0.800 g, 3.94×10$^{-3}$ mol) and Vazo 64 (0.0500 g, 3.04×10$^{-4}$ mol) in toluene (93 mL) was purged with nitrogen for 15 minutes. The stirred solution was then heated to 70° C. for 18 h. Removal of the toluene in vacuo gave 39.35 g of polymer product. Properties of this polymer are given in Table 1.

EXAMPLE 3

A mixture of n-butyl acrylate (36.00 g, 0.28 mol), 4TBPA (4.00 g, 0.020 mol) and Vazo 64 (0.0500 g, 3.04×10$^{-4}$ mol) in toluene (93 mL) was purged with nitrogen for 15 minutes. The stirred solution was then heated to 70° C. for 18 h. Removal of the toluene in vacuo gave 39.35 g of polymer product. Properties of this polymer are given in Table 1.

EXAMPLE 4

A mixture of n-butyl acrylate (64.0 g, 0.50 mol), 4TBPA (16.00 g, 0.079 mol) and Vazo 64 (0.1423 g, 8.67×10$^{-4}$ mol) in toluene (187 mL) was purged with nitrogen for 15 minutes. The stirred solution was then heated to 70° C. for 18 h. Removal of the toluene in vacuo gave 74.35 g of polymer product. Properties of this polymer are given in Table 1.

EXAMPLES 5–13

In addition to n-butyl acrylate copolymers prepared from N-(4-tert-butylphenyl)acrylamide (4TBPA), a series of n-butyl acrylate copolymers with other acrylamides was prepared. Copolymers (90/10 wt. %) of n-butyl acrylate and N-phenyl acrylamide, N-(2-tert-butylphenyl)acrylamide, N-tert-butyl acrylamide, 4-tert-butylphenyl acrylate, N-(4-tert-butyl)maleimide, N-(4-tert-butylphenyl)methacrylamide, N-(4-methylphenyl)acrylamide, N-(4-ethylphenyl)acrylamide and N-(4-isopropylphenyl)acrylamide were synthesized. These copolymers comprise Examples 5–13 respectively. They were prepared in the same manner as the polymers in Examples 1–4. The monomers were mixed with Vazo 64 initiator (0.15 mole % of initiator per mole of monomer) in toluene (30 wt. % solids) and heated to 70° C. for 18 h. Removal of the toluene in vacuo gave the polymer products in nearly quantitative yields. Properties of these polymers are given in Table 1.

TABLE 1

| Example # | Comonomers[1] | Monomer Feed (wt. %) | Polymer Composition[2] (mole %) | Molecular Weight[3] (× 1000) | | | Tg (°C.) | |
|---|---|---|---|---|---|---|---|---|
| | | | | Mw | Mn | Mw/Mn | Onset | Midpoint |
| 1 | BA | 100 | — | 164 | 46.3 | 3.55 | −51 | −44 |
| 2 | BA / acrylamide-C(CH$_3$)$_3$ phenyl | 98/2 | 98 ± 3 / 2 ± 1 | 134 | 37.0 | 3.6 | −46 | −40 |
| 3 | BA / acrylamide-C(CH$_3$)$_3$ phenyl | 90/10 | 93 ± 3 / 7 ± 2 | 166 | 49.4 | 3.4 | −41 | −28 |

TABLE 1-continued

| | | Polymer Properties | | | | | |
|---|---|---|---|---|---|---|---|
| Example # | Comonomers[1] | Monomer Feed (wt. %) | Polymer Composition[2] (mole %) | Molecular Weight[3] (× 1000) | | | Tg (°C.) |
| | | | | Mw | Mn | Mw/Mn | Onset Midpoint |
| 4 | BA / acrylamide-N-(4-tert-butylphenyl) | 80/20 | 85 ± 3<br>15 ± 2 | 166 | 30.4 | 5.4 | −53  −20 |
| 5 | BA / acrylamide-N-phenyl | 90/10 | 89 ± 3<br>11 ± 2 | 132 | 35.3 | 3.75 | −42  −32 |
| 6 | BA / acrylamide-N-(2-tert-butylphenyl) | 90/10 | 93 ± 3<br>7 ± 1 | 298 | 56.5 | 5.28 | −40  −32 |
| 7 | BA / N-tert-butylacrylamide | 90/10 | 70 ± 7<br>30 ± 7 | 163 | 53.4 | 3.05 | −34  −28 |
| 8 | BA / 4-tert-butylphenyl acrylate | 90/10 | 94 ± 4<br>6 ± 1 | 167 | 52.7 | 3.18 | −44  −36 |
| 9 | BA / N-(4-tert-butylphenyl)maleimide | 90/10 | 94 ± 3<br>6 ± 2 | 115 | 31.1 | 3.62 | −40  −29 |
| 10 | BA / methacrylamide-N-(4-tert-butylphenyl) | 90/10 | | 135 | 42.7 | 3.17 | −43  −31 |

TABLE 1-continued

| Example # | Comonomers[1] | Monomer Feed (wt. %) | Polymer Composition[2] (mole %) | Molecular Weight[3] (× 1000) Mw | Mn | Mw/Mn | Tg (°C.) Onset | Midpoint |
|---|---|---|---|---|---|---|---|---|
| 11 | BA / =\\—C(O)—NH—C6H4—CH3 | 90/10 | 92 ± 3 / 8 ± 2 | 189 | 50.3 | 3.77 | −47 | −36 |
| 12 | BA / =\\—C(O)—NH—C6H4—CH2CH3 | 90/10 | 85 ± 3 / 15 ± 2 | 216 | 6.27 | 3.44 | −40 | −32 |
| 13 | BA / =\\—C(O)—NH—C6H4—CH(CH3)2 | 90/10 | 94 ± 3 / 6 ± 2 | 155 | 36.2 | 4.28 | −46 | −37 |

[1]BA = n-butyl acrylate
[2]By quantitative $^{13}$C NMR
[3]By GPC on a Waters 150 GPC interfaced to a Model 100 Viscotek Differential Viscometer. Molecular weights are relative to poly(styrene) standards.

EXAMPLES 14–26

The polymers prepared in Examples 1–13 above were evaluated for their ability to bond aluminum to poly(propylene). ASTM test method D 903–49 (180° Peel) was used as a guide for sample preparation and testing. A degreased 5 mil thick aluminum sheet was used as one of the substrates and a 40 mil compression molded plaque of poly(propylene) (Amoco PP-4017) served as the other substrate. The polymers were prepared as 20 wt. % solutions in toluene. Each solution was applied to the aluminum sheet using a wet film applicator with a 10 mil clearance. This procedure was previously demonstrated to provide a 1 mil thick adhesive (dry) layer. Five specimens were tested for each material. All testing was performed at room temperature. Table 2 summarizes the peel strength data and the fracture mode for each sample.

TABLE 2

Aluminum-Poly(propylene) Adhesive Data

| Example # | Comonomers[1] | Monomer Feed (wt. %) | Polymer Composition[2] (mole %) | Peel Strength/ Fracture Mode [lb/in] |
|---|---|---|---|---|
| 14 | BA | 100 | — | 0.32 ± 0.07 cohesive |

TABLE 2-continued

Aluminum-Poly(propylene) Adhesive Data

| Example # | Comonomers[1] | Monomer Feed (wt. %) | Polymer Composition[2] (mole %) | Peel Strength/ Fracture Mode [lb/in] |
|---|---|---|---|---|
| 15 | 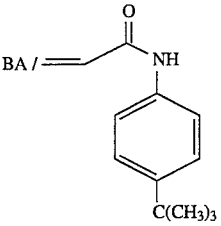 BA / acrylamide-NH-C6H4-C(CH3)3 | 98/2 | 98 ± 3<br>2 ± 1 | 0.35 ± 0.07<br>mixed |
| 16 | 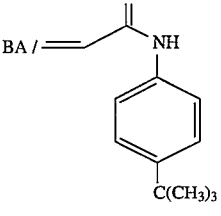 BA / acrylamide-NH-C6H4-C(CH3)3 | 90/10 | 93 ± 3<br>7 ± 2 | 4.00 ± 0.57<br>mixed |
| 17 | 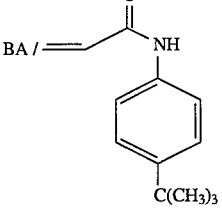 BA / acrylamide-NH-C6H4-C(CH3)3 | 80/20 | 85 ± 3<br>15 ± 2 | 0.81 ± 0.30<br>adhesive |
| 18 | 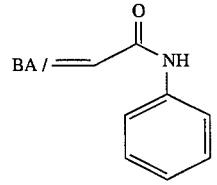 BA / acrylanilide | 90/10 | 89 ± 3<br>11 ± 2 | 2.27 ± 1.10<br>mixed-mostly adhesive |
| 19 | 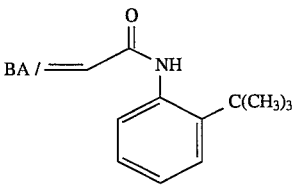 BA / ortho-tBu acrylanilide | 90/10 | 93 ± 3<br>7 ± 1 | 1.80 ± 0.39<br>cohesive |
| 20 | 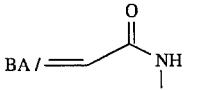 BA / N-tBu acrylamide | 90/10 | 70 ± 7<br>30 ± 7 | 2.00 ± 0.14<br>cohesive |
| 21 | 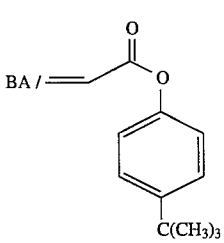 BA / 4-tBu phenyl acrylate | 90/10 | 94 ± 3<br>6 ± 1 | 0.55 ± 0.12<br>cohesive |

TABLE 2-continued

Aluminum-Poly(propylene) Adhesive Data

| Example # | Comonomers[1] | Monomer Feed (wt. %) | Polymer Composition[2] (mole %) | Peel Strength/ Fracture Mode [lb/in] |
|---|---|---|---|---|
| 22 | 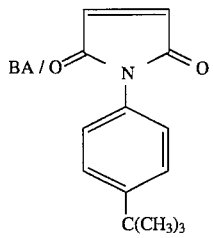 | 90/10 | 94 ± 3<br>6 ± 2 | 2.45 ± 0.04<br>mostly cohesive |
| 23 | 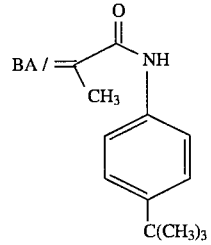 | 90/10 | | 2.67 ± 0.44<br>mixed-mostly adhesive |
| 24 | 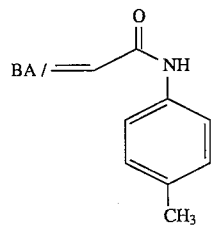 | 90/10 | 92 ± 3<br>8 ± 2 | 3.80 ± 1.08<br>adhesive |
| 25 | 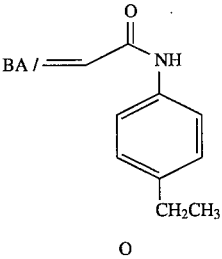 | 90/10 | 85 ± 3<br>15 ± 2 | 2.50 ± 0.83<br>mixed |
| 26 | 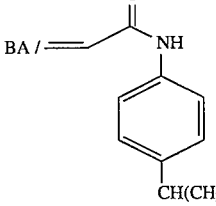 | 90/10 | 94 ± 3<br>6 ± 2 | 3.02 ± 0.04<br>mixed-mostly adhesive |

[1]BA = n-butyl acrylate
[2]By quantitative $^{13}C$ NMR

EXAMPLE 27

Deionized water (200.0 g), a 10% aqueous solution of Igepal CA-887 (3.40 g) and a 10% aqueous solution of Igepal CA-630 (1.60 g) (Igepal is the Trademark for ethoxylated nonyl phenols available commercially from Rhone-Poulene, Inc.) were added to Airflex 465 (455 g), a commercial ethylene/vinyl acetate polymer emulsion sold by Air Products and Chemicals, Inc., stirred at 200 rpm. A solution of n-butyl acrylate (100.0 g) and Vazo 64 (2.00 g) was prepared and added to the diluted emulsion over 20 min. Stirring was maintained at 200 rpm. The reaction vessel was purged with nitrogen for 30 min. The reaction mixture was then heated to 60° C. When the reaction temperature reached 60° C., n-butyl acrylate (100.0 g) and a stabilizer solution were added to the reaction at a rate of 1.7 mL/min and 1.0 mL/min respectively. The stabilizer solution for the delay feed was prepared by adding a 10% aqueous solution of Vinol 203 (12.00 g), a 10% aqueous solution of Vinol 107 (8.00 g) (Vinol, now sold under the Trademark Airvol, is a low viscosity, partially hydrolyzed polyvinyl alcohol polymer available from Air Products and Chemicals, Inc.), a 10% aqueous solution of Igepal CA-887 (13.60 g) and a 10% aqueous solution of Igepal CA-630 (6.40 g) to deionized water (20.00 g). Addition of the delay feed solutions required approximately 1 h. The temperature was maintained at 60° C. for an additional 2.5 h. The resulting emulsion was stable. Polymer films which were cast and dried from the emulsion had glass transition temperatures at −30° C. and −1.5° C.

EXAMPLE 28

Deionized water (200.0 g), a 10% aqueous solution of Igepal CA-887 (3.40 g) and a 10% aqueous solution of Igepal CA-630 (1.60 g) were added to Airflex 465 (455 g) stirred at 200 rpm. A solution of n-butyl acrylate (90.00 g), 4TBPA (10.00 g) and Vazo 64 (2.00 g) was prepared and added to the diluted emulsion over 20 min. Stirring was maintained at 200 rpm. The reaction vessel was purged with nitrogen for 30 min. The reaction mixture was the heated to 60° C. When the reaction temperature reached 60° C., a monomer solution and a stabilizer solution were added to the reaction at a rate of 1.7 mL/min and 1.0 mL/min respectively. The monomer solution for this delay feed consisted of n-butyl acrylate (90.00 g) and 4TBPA (10.00 g). The stabilizer solution for the delay feed was prepared by adding a 10% aqueous solution of Vinol 203 (12.00 g), a 10% aqueous solution of Vinol 107 (8.00 g), a 10% aqueous solution of Igepal CA-887 (13.60 g) and a 10% aqueous solution of Igepal CA-630 (6.40 g) to deionized water (20.00g). Addition of the delay feed solutions required approximately 1 h. The temperature was maintained at 60° C. for an additional 2 h. The resulting emulsion was stable. Polymer films which were cast and dried from the emulsion had glass transition temperatures at −35.5° C. and −1° C.

EXAMPLE 29

The pH of a mixture of a 10% aqueous solution of Vinol 203 (316.0 g), a 10% aqueous solution of Vinol 107 (211.0 g) and deionized water (270.0 g) was adjusted to 4.0 by adding acetic acid (4.2 g). Igepal CO-887 (50.0 g) was dissolved in this solution. A 1.0% aqueous solution of ferrous ammonium sulfate (4.3 mL) was then added and this premix was allowed to stand for 1 h. The premix was then charged to a 1 gallon reactor and agitated at 200 rpm. Vinyl acetate (775.0 g) was charged to the reactor, and the reactor was purged with nitrogen and ethylene. After a minimum of 0.5 h at 200 rpm, the agitation was increased to 900 rpm, the reactor was pressurized with 460 psi of ethylene and the temperature was adjusted to 30° C. The polymerization was initiated by the addition of a 0.6% aqueous solution of hydrogen peroxide (added at 0.4 mL/min) and a 10% aqueous solution of zinc formaldehyde sulfoxylate (ca. 91 mL added at 0.5 mL/min). After the initial temperature rise had levelled off, addition of a 1.0% aqueous solution of hydrogen peroxide was begun at a rate such that the reaction temperature was 60° C. after 1 h. When the temperature equilibrated at 60° C., the ethylene make up pressure was set at 550 psi and addition of a mixture of butyl acrylate (309.0 g), vinyl acetate (617.0 g) and 4TBPA (103.0 g) was begun (9.6 mL/min over 2 h). When free vinyl acetate monomer dropped to less than 3%, addition of the 1.0% hydrogen peroxide and zinc formaldehyde sulfoxylate solutions was halted and a 7.0% aqueous solution of hydrogen peroxide (56 mL) was added over about 1 h at a gradually increasing rate (0.5 to 1.0 mL/min). After addition of the 7.0% hydrogen peroxide was completed, the reaction was cooled to 30° C. and the pH of the emulsion was adjusted to 5.0 with 14% aqueous ammonia. The emulsion was transferred to a degasser and agitated at 200 rpm. Colloid 585 (0.50 g), a defoaming agent, was added while the emulsion was being transferred. After transfer was completed, a 70% aqueous solution of tert-butyl hydroperoxide (2.50 g), sodium acetate (1.60 g) and sodium citrate (1.60 g) in deionized water (25 g) was added to the emulsion, and the resulting emulsion was agitated for 12 h at 100 rpm. The resulting emulsion was stable. Polymer films which were cast and dried from the emulsion had a glass transition temperature at −1.0° C.

EXAMPLE 30

The pH of a mixture of a 10% aqueous solution of Vinol 203 (316.0 g), a 10% aqueous solution of Vinol 107 (211.0 g) and deionized water (270.0 g) was adjusted to 4.0 by adding acetic acid (3.1 g). Igepal CO-887 (50.0 g) was dissolved in this solution. A 1.0% aqueous solution of ferrous ammonium sulfate (4.3 mL) was then added and this premix was allowed to stand for 1 h. The premix was then added to a 1 gallon reactor and agitated at 200 rpm. Vinyl acetate (1141.0 g) was charged to the reactor, and the reactor was purged with nitrogen and ethylene. After a minimum of 0.5 h at 200 rpm, the agitation was increased to 900 rpm, the reactor was pressurized with 500 psi of ethylene and the temperature was adjusted to 30° C. The polymerization was initiated by the addition of a 0.6% aqueous solution of hydrogen peroxide (added at 0.4 mL/min) and a 10% aqueous solution of zinc formaldehyde sulfoxylate (ca. 91 mL added at 0.5 mL/min). After the initial temperature rise had levelled off, addition of a 1.0% aqueous solution of hydrogen peroxide was begun at a rate such that the reaction temperature was 60° C. after 1 h. When the temperature equilibrated at 60° C., the ethylene make up pressure was set at 550 psi and addition of a mixture of vinyl acetate (540.0 g) and 4TBPA (90.0 g) was begun (5.1 mL/min over 2 h). When free vinyl acetate monomer dropped to less than 3%, addition of the 1.0% hydrogen peroxide and zinc formaldehyde sulfoxylate solutions was halted and a 7.0% aqueous solution of hydrogen peroxide (56 mL) was added over about 1 h at a gradually increasing rate (0.5 to 1.0 mL/min). After addition of the 7.0% hydrogen peroxide was completed, the reaction was cooled to 30° C. and the pH of the emulsion was adjusted to 5.0 with 14% aqueous ammonia. The emulsion was transferred to a degasser and agitated at 200 rpm. Colloid 585 (0.50 g), a defoaming agent, was added while the emulsion was being transferred. After transfer was completed, a 70% aqueous solution of tert-butyl hydroperoxide (2.50 g), sodium acetate (1.60 g) and sodium citrate (1.60 g) in deionized water (25 g) was added to the emulsion, and the resulting emulsion was agitated for 12 h at 100 rpm. The resulting emulsion was stable. Polymer films which were cast and dried from the emulsion had a glass transition temperature at −6.5° C.

EXAMPLE 31

The pH of a mixture of a 10% aqueous solution of Vinol 203 (316.0 g), a 10% aqueous solution of Vinol 107 (211.0 g) and deionized water (270.0 g) was adjusted to 4.0 by adding acetic acid (3.8 g). Igepal CO-887 (50.0 g) was dissolved in the solution. A 1.0% aqueous solution of ferrous ammonium sulfate (4.3 mL) was then added and this premix was allowed to stand for 1 h. The premix was then added to a 1 gallon reactor and agitated at 200 rpm. Vinyl acetate (703.0 g) was charged to the reactor, and the reactor was purged with nitrogen and ethylene. After a minimum of 0.5 h at 200 rpm, the agitation was increased to 900 rpm, the reactor was pressurized with 500 psi of ethylene and the temperature was adjusted to 30° C. The polymerization was initiated by the addition of a 0.6% aqueous solution of hydrogen peroxide (added at 0.4 mL/min) and a 10% aqueous solution of zinc formaldehyde sulfoxylate (ca. 91 mL added at 0.5 mL/min). After the initial temperature rise had levelled off, addition of a 1.0% aqueous solution of hydrogen peroxide was begun at a rate such that the reaction temperature was 60° C. after 1 h. When the temperature equilibrated at 60° C., the ethylene make up pressure was set at 550 psi and addition of a mixture of vinyl acetate (1,071.0 g) and 4TBPA (179.0 g) was begun (11.5 mL/min over 2 h). When free vinyl acetate monomer dropped to less than 3%, addition of the 1.0% hydrogen peroxide and zinc formaldehyde sulfoxylate solutions was halted and a 7.0% aqueous solution of hydrogen peroxide (56 mL) was added over about 1 h at a gradually increasing rate (0.5 to 1.0 mL/min). After addition of the 7.0% hydrogen peroxide was completed, the reaction was cooled to 30° C. and the pH of the emulsion was adjusted to 5.0 with 14% aqueous ammonia. The emulsion was transferred to a degasser and agitated at 200 rpm. Colloid 585 (0.50 g), a defoaming agent, was added while the emulsion was being transferred. After transfer was completed, a 70% aqueous solution of tert-butyl hydroperoxide (2.50 g), sodium acetate (1.60 g) and sodium citrate (1.60 g) in deionized water (25 g) was added to the emulsion, and the resulting emulsion was agitated for 12 h at 100 rpm. The resulting emulsion was stable. Polymer films which were cast and dried from the emulsion had a glass transition temperature at 5° C.

EXAMPLES 32–37

The emulsions prepared in Examples 27–31, along with a vinyl acetate/ethylene emulsion, were evaluated for their ability to bond aluminum to poly(propylene). This involved testing their tensile adhesive strength in bonding untreated, oriented poly(propylene), OPP, to aluminum using the following procedure.

A film of the emulsion adhesive was cast on the OPP by application of 5–10 mL of adhesive emulsion to the OPP surface and then spreading the adhesive to a uniform thickness using a wire wound rod (#40). This procedure resulted in a dry film thickness of the adhesive of 1.0–1.5 mil (0.0010–0.0015 inch). The emulsion was allowed to dry on the OPP surface until transparent, usually 30 minutes. At this point, a clean dry aluminum sheet (10 mil thick) was placed over the cast film and the OPP backing was inverted. An identical procedure was used to cast a second film on the reverse side of the OPP. When this second film was dry, a second aluminum sheet was contacted with the film and the symmetrical laminate was sealed in a press at 100° C. for 1 minute under 20 psi pressure.

Thus bonded, the laminate consisted of one layer of OPP at the center, two layers of emulsion adhesive (one on each surface of the OPP film) and two sheets of aluminum, one bonded to each surface of the emulsion adhesive. This laminate was then cut into test specimens using a circular die with an area of 3.98 in². Sixteen individual specimens were cut from each laminate. Each of these specimens was then bonded, using epoxy adhesive, to a steel test fixture designed to fit the grips of an Instron testing machine. The epoxy was allowed to cure overnight at room temperature before the specimens were tested.

Tensile adhesive performance was measured by attaching the test specimens to the grips of the testing machine and measuring the maximum load as the sample was debonded at a crosshead speed of 0.5 in./min. Occasionally, failure occurred in the epoxy bond due to incomplete coating or at an obvious flaw within the test specimen; these values were excluded in computing the average behavior of each adhesive.

The reported tensile adhesive strength is thus the maximum load achieved in the above experiment normalized for the cross sectional area of the adhesive specimen.

The results of these tests are presented in Table 3. Example 32 is a commercial vinyl acetate/ethylene emulsion, Airflex 465, sold by Air 10 Products and Chemicals, Inc. Example 33 is the emulsion prepared in Example 27, which is n-butyl acrylate post polymerized in Airflex 465. Example 34 is the emulsion prepared in Example 28, which is a mixture of n-butyl acrylate and 4TBPA (90/10 wt. %) post polymerized in Airflex 465. Examples 35–37 are the emulsions prepared in Examples 29–31 respectively. They consist of: a vinyl acetate/ethylene/butyl acrylate/4TBPA emulsion, Example 29; a vinyl acetate/ethylene/4TBPA emulsion with a 4 wt. % loading of 4TBPA, Example 30; and a vinyl acetate/ethylene/4TBPA emulsion with an 8 wt. % loading of TBPA, Example 31.

TABLE 3

| Aluminum to Poly(propylene) Tensile Adhesive Data for Emulsion Polymers | |
|---|---|
| Example | Tensile Strength (psi) |
| 32 | 114 |
| 33 | 120 |
| 34 | 160 |
| 35 | 172 |
| 36 | 180 |
| 37 | 213 |

Having thus described the present invention, what is now deemed appropriate for Letters Patent is set out in the following claims.

We claim:

1. In a method for coating a polyolefin surface with a coating material comprising an emulsion polymer derived from acrylates or vinyl acetate/ethylene or a solution polymer derived from methylacrylate, ethylacrylate, butylacrylate, or 2-ethylhexylacrylate, the improvement for enhancing the adhesion of said coating material to the polyolefin surface comprising employing a coating material which comprises said type of emulsion polymer or solution polymer which contains from about to 2 to 25 wt % copolymerized monomer units selected from the group consisting of:

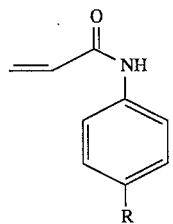

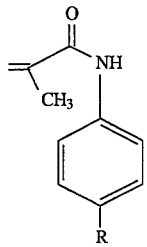

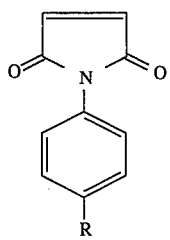

wherein R is a $C_1$-$C_8$ alkyl group.

2. The method of claim 1 wherein R is a methyl or t-butyl group.

3. The method of claim 1 wherein said polymeric coating material is a solution polymer system.

4. The method of claim 3 wherein said polymeric coating material is derived from one or more acrylate monomers.

5. The method of claim 4 wherein said acrylate monomers are butyl acrylate or 2-ethylhexylacrylate.

6. The method of claim 1 wherein said polymeric coating material is an emulsion polymer system.

7. The method of claim 6 wherein said polymeric coating material is derived from vinyl acetate/ethylene.

\* \* \* \* \*